United States Patent
Bringuier et al.

(10) Patent No.: US 11,880,083 B2
(45) Date of Patent: Jan. 23, 2024

(54) FOAMED TUBE HAVING FREE SPACE AROUND RIBBON STACKS OF OPTICAL FIBER CABLE

(71) Applicant: Corning Research & Development Corporation, Corning, NY (US)

(72) Inventors: Anne Germaine Bringuier, Taylorsville, NC (US); Xiaole Cheng, Painted Post, NY (US); Sergey Vladimirovich Chernykh, Hickory, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 18/084,857

(22) Filed: Dec. 20, 2022

(65) Prior Publication Data
US 2023/0118149 A1    Apr. 20, 2023

Related U.S. Application Data

(63) Continuation of application No. PCT/US2021/038355, filed on Jun. 22, 2021.
(Continued)

(51) Int. Cl.
G02B 6/44        (2006.01)
(52) U.S. Cl.
CPC ........... *G02B 6/4486* (2013.01); *G02B 6/448* (2013.01)
(58) Field of Classification Search
CPC .............................. G02B 6/4486; G02B 6/448
(Continued)

(56) References Cited

U.S. PATENT DOCUMENTS 6,226,431 B1    5/2001 Brown et al.
6,749,446 B2    6/2004 Nechitailo
(Continued)

FOREIGN PATENT DOCUMENTS

WO   WO-2020028338 A1 *  2/2020  ........... G02B 6/4411
WO   2020/117547 A1     6/2020
WO   WO-2020117547 A1 *  6/2020  ............. G02B 6/443

OTHER PUBLICATIONS

International Search Report and Written Opinion of the International Searching Authority; PCT/US2021/038355; dated Oct. 15, 2021; 15 pages; United States Patent Office.

*Primary Examiner* — Jerry M Blevins
(74) *Attorney, Agent, or Firm* — Thomas R. Irwin (57) ABSTRACT

Embodiments of the disclosure relate to an optical fiber cable. The optical fiber cable includes a cable jacket having an inner jacket surface and an outer jacket surface. The outer jacket surface is an outermost surface of the optical fiber cable, and the inner jacket surface defines an internal jacket bore. The optical fiber cable also includes at least one subunit disposed within the internal jacket bore. Each of the at least one subunit includes a foamed tube having an inner subunit surface and an outer subunit surface. The inner subunit surface defines a central subunit bore. Each of the at least one subunit also includes a stack of at least two optical fiber ribbons disposed in the central subunit bore of the foamed tube. Each of the at least two optical fiber ribbons comprising at least two optical fibers. The stack occupies from 85%-95% of a cross-sectional area of the central subunit bore such that the central subunit bore provides from 5% to 15% of free space around the stack along at least a portion of a length of the foamed tube.

20 Claims, 4 Drawing Sheets

Related U.S. Application Data

(60) Provisional application No. 63/046,208, filed on Jun. 30, 2020.

(58) Field of Classification Search
USPC .......................................................... 385/113
See application file for complete search history.

(56) References Cited

U.S. PATENT DOCUMENTS

| | | | | |
|---|---|---|---|---|
| 2003/0152350 A1* | 8/2003 | Konda | ................ | C03C 25/1065 |
| | | | | 385/128 |
| 2009/0003785 A1* | 1/2009 | Parris | ................... | G02B 6/4494 |
| | | | | 385/123 |
| 2015/0049996 A1* | 2/2015 | Gibbs | .................. | G02B 6/4432 |
| | | | | 385/103 |
| 2016/0313529 A1* | 10/2016 | Baucom | ............. | G02B 6/44384 |

* cited by examiner

FOAMED TUBE HAVING FREE SPACE AROUND RIBBON STACKS OF OPTICAL FIBER CABLE

CROSS-REFERENCE TO RELATED APPLICATIONS

This application is a continuation of International Patent Application No. PCT/US2021/038355 filed Jun. 22, 2021, which claims the benefit of priority of U.S. Provisional Application No. 63/046,208 filed on Jun. 30, 2020, the content of which is relied upon and incorporated herein by reference in its entirety.

BACKGROUND

The present invention is related to an optical fiber cable having a foamed tube around a ribbon stack of an optical fiber cable, in particular, a foamed tube providing free space around a ribbon stack of an optical fiber cable. Optical fiber cables incorporate a variety of materials with function-specific properties in multiple layers to achieve desired performance. For examples, the cable jacket and buffer tubes are often made of polyolefin materials. The optical fiber cable may also include relatively inflexible materials, such as one or more glass-reinforced plastic strength members. Though the polyolefins often provide good flexibility, the strength members may create signal attenuation when the cable is bent, coiled, crushed, or twisted.

SUMMARY

In one aspect, embodiments of the present disclosure relate to an optical fiber cable. The optical fiber cable includes a cable jacket having an inner jacket surface and an outer jacket surface. The outer jacket surface is an outermost surface of the optical fiber cable, and the inner jacket surface defines an internal jacket bore. The optical fiber cable also includes at least one subunit disposed within the internal jacket bore. Each of the at least one subunit includes a foamed tube having an inner subunit surface and an outer subunit surface. The inner subunit surface defines a central subunit bore. Each of the at least one subunit also includes a stack of at least two optical fiber ribbons disposed in the central subunit bore of the foamed tube. Each of the at least two optical fiber ribbons comprising at least two optical fibers. The stack occupies from 85%-95% of a cross-sectional area of the central subunit bore such that the central subunit bore provides from 5% to 15% of free space around the stack along at least a portion of a length of the foamed tube.

In another aspect, embodiments of the present disclosure relate to a method of preparing an optical fiber cable. In the method, a foam composition is prepared. The foam composition includes a polymer component of 70% to 100% by weight of a thermoplastic elastomer (TPE) and 0% to 30% by weight of low density polyethylene. The TPE has an unfoamed tensile modulus of at most 10 MPa at 100% secant as measured according ASTM D638. Further, in the method, a foamed tube made of the foam composition is extruded around a stack of optical fiber ribbons so as to form a subunit having a central bore providing from 5% to 15% of free space around the stack along a length of the foamed tube.

In yet another aspect, embodiments of the present disclosure relate to a subunit of an optical fiber cable. The subunit includes a foamed tube made of 70% to 100% by weight of a thermoplastic elastomer (TPE) and 0% to 30% by weight of low density polyethylene. The foamed tube has an inner surface and an outer surface, and the inner surface defines a central bore. The subunit also includes a stack of at least two optical fiber ribbons disposed in the central bore of the foamed tube. Each of the at least two optical fiber ribbons includes at least two optical fibers. The cross-section of the central bore provides from 5% to 15% of free space around the stack along a length of the foamed tube, and the foamed tube has a compression modulus of less than 3 MPa when measured at 50% strain as measured according to ASTM 3574.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION

Referring generally to the figures, embodiments of the present disclosure relate to a foam composition that can be extruded to form a foamed tube around each ribbon stack of an optical fiber cable. The foam is formed from a thermoplastic elastomer (TPE) and optionally low density polyethylene (LDPE) and is extruded around the ribbon stack in such a manner to form a tube providing from 5% to 15% of free space around the ribbon stack. In this way, the foam provides cushioning for the optical fiber ribbon stacks while also allowing for a degree of movement for the ribbons. Advantageously, the foamed tube with free space helps prevent attenuation of the optical fibers when the cable is bent, crushed, twisted, flexed, etc., including during manufacturing. These and other advantages and aspects of the foamed tube will be discussed in relation to the embodiments disclosed and depicted herein, especially as they relate to an optical fiber cable. However, these embodiments are exemplary in nature, not limiting.

Figure 1:
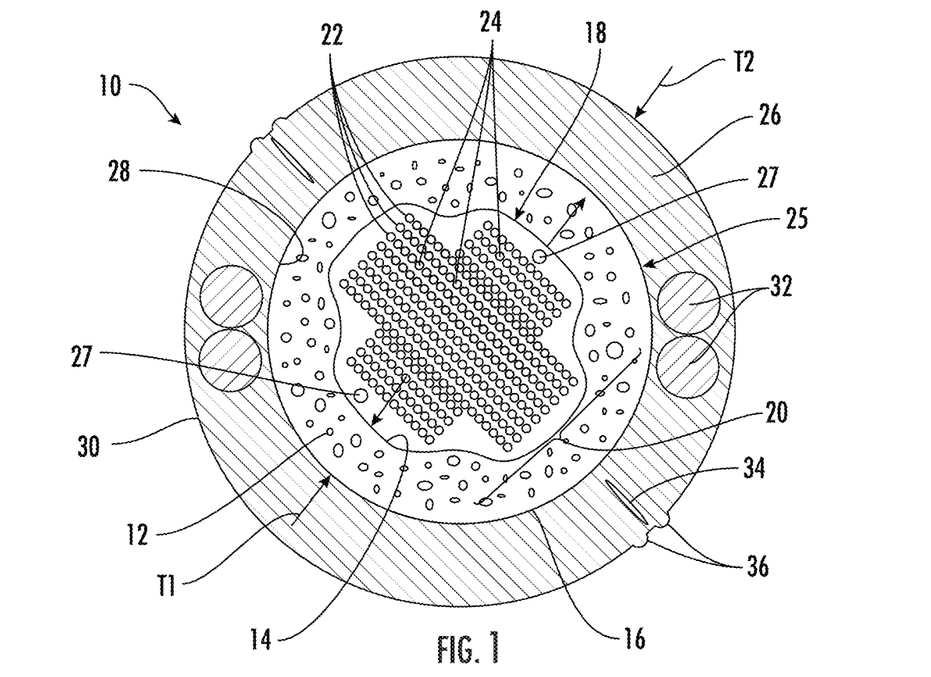
FIG. 1 is longitudinal, cross-sectional view of an optical fiber cable having a single ribbon stack contained within a foamed tube, according to an exemplary embodiment.

FIG. 1 depicts a longitudinal, cross-sectional view of an optical fiber cable 10. The optical fiber cable 10 includes at least one foamed tube 12. The foamed tube 12 has an inner surface 14 and an outer surface 16 that define a thickness T1 therebetween. In embodiments, the thickness T1 is on average from 0.3 mm to 1.2 mm. The inner surface 14 defines a central bore 18 that extends along the longitudinal axis of the optical fiber cable 10 for at least a portion of the length of the optical fiber cable 10. Disposed within the central bore 18 of the foamed tube 12 is a stack 20 of optical fiber ribbons 22. Each optical fiber ribbon 22 includes a plurality of optical fibers 24 arranged in a substantially planar array. In embodiments, the optical fibers 24 may be held in the array via a binding matrix and at least one coating of a curable resin. In the embodiment shown in FIG. 1, the ribbons 22 include twelve or twenty-four optical fibers 24 in sixteen optical fiber ribbons 22. Thus, in FIG. 1, the stack 20 includes 288 optical fibers 24. However, in other embodiments, the optical fiber ribbons 22 may include, e.g., from four to twenty-four optical fibers 24, and the stack 20 may include, e.g., from two to twenty ribbons 22.

Figure 2:
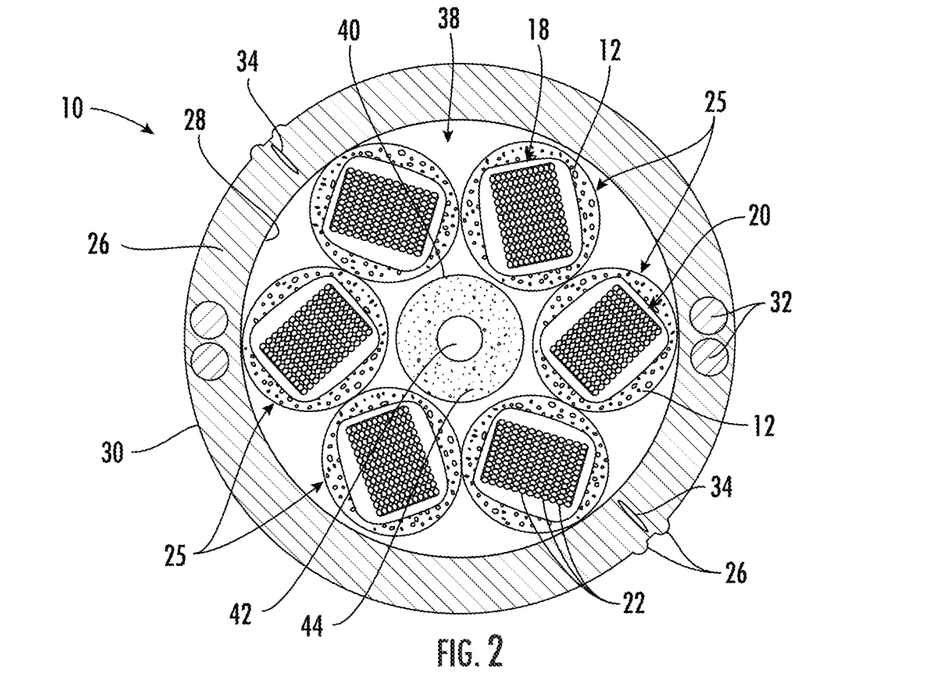
FIG. 2 is a longitudinal, cross-sectional view of an optical fiber cable having a plurality of ribbon stacks each contained within a foam tube, according to an exemplary embodiment.

Together, the stack 20 of optical fiber ribbons 22 and the foamed tube 12 may be referred to herein as a "subunit" 25. In the embodiment of FIG. 1, the optical fiber cable 10 includes a single subunit 25, but in other embodiments (such as depicted in FIG. 2), the optical fiber cable 10 may include more than one subunit 25. In embodiments, the optical fiber cable 10 may include up to twelve subunits 25. Thus, an optical fiber cable 10 may carry up to 3456 optical fibers 24 (i.e., 288 optical fibers per subunit) in embodiments. As can be seen in FIG. 1, the stack 20 of optical fiber ribbons 22 does not have a wrap that is conventionally used to hold the optical fiber ribbons 22 in the stack 20. The Applicant has found that such wraps do not, in certain circumstances, adequately protect the optical fibers 24 on the corners of the stack 20 from attenuation during coiling and bending.

Instead, according to the present disclosure, the stack 20 is surrounded by the foamed tube 12, and as shown in FIG. 1, the inner surface 14 of the foamed tube 12 does not tightly enclose the stack 20. That is, along the length of the foamed tube 12, the central bore 18 provides a degree of free space for movement of the stack 20 within the foamed tube 12. As used herein, "free space" refers to the percentage of cross-sectional area of the central bore 18 not occupied by the stack 20 along the length of the foamed tube 12. In embodiments, the free space may include just a gas (such as air), and in other embodiments, the free space may include a gas and other materials that do not hinder movement of the optical fiber ribbons 22 of the stack 20, such as water-blocking materials (gels, powders, yarns, etc.). In embodiments, the central bore 18 of the foamed tube 12 defines from 5% to 15% of free space around the stack 20, i.e., the stack 20 occupies from 85% to 95% of the cross-sectional area of the central bore 18 of the foamed tube 12. The foamed tube 12 cushions the optical fiber ribbons 22 during bending and coiling while maintaining stack integrity, and the free space allows the optical fiber ribbons 22 a degree of movement during bending and coiling. In this way, attenuation, especially at the corners of the stack 20, is substantially reduced or eliminated.

Additionally, as shown in FIG. 1, the foamed tube 12 may include a water-blocking feature, such as a water-blocking yarn 27 and/or super-absorbent polymer (SAP) powder, in the central bore 18. In the embodiment depicted, there are two water-blocking yarns 27, but in other embodiments, there may be a single water-blocking yarn 27 or more than two water-blocking yarns 27, such as three to eight water-blocking yarns 27. In embodiments, the water-blocking yarns 27 are cotton, aramid, glass, basalt, or other fiber yarns impregnated with SAP powder. Advantageously, water-blocking yarns 27 can be used as access features to open the foamed tube 12 by using the water-blocking yarn 27 as a ripcord to tear the foamed tube 12.

Surrounding the foamed tube 12 along the longitudinal axis is a cable jacket 26. The cable jacket 26 has an inner surface 28 and an outer surface 30 that define an average jacket thickness T2. In embodiments, the cable jacket 26 has a thickness T2 of from 3.6 mm to 6.0 mm. In embodiments, the cable jacket 26 has a thickness T2 of about 4.6 mm. In embodiments, the outer surface 30 of the cable jacket 26 defines the outermost surface of the optical fiber cable 10. As depicted in FIG. 1, the optical fiber cable 10 may include one or more strength elements 32 embedded in the cable jacket 26 between the inner surface 28 and the outer surface 30. In the embodiment of FIG. 1, there are four strength elements 32 arranged in diametrically opposed pairs. Exemplary strength elements 32 include glass-reinforced plastic (GRP) rods, metal wire, resin-impregnated yarns (e.g., cotton, aramid, glass, or basalt yarns). In embodiments, the thickness T2 is limited on the low end of the thickness T2 range by the size of the strength elements 32.

As shown in FIG. 1, the cable jacket 26 may include one or more preferential access features 34. In embodiments, the preferential access feature 34 is a strip of polymer dissimilar from the polymer from which the cable jacket 26 is made. For example, a preferential access feature 34 may be a strip of polypropylene contained within a polyethylene cable jacket 26. The immiscibility of the polymers helps to split the cable jacket 26 open to access the interior of the optical cable fiber. Further, as depicted in FIG. 1, the location of the preferential access feature 34 is identified by locating ridges 36. The locating ridges 36 provide a visual and tactile indicator of the location of the preferential access feature 34. In the embodiment depicted in FIG. 1, two locating ridges 36 are provided for each preferential access feature with one locating ridge 36 on each side of the preferential access feature 34.

Referring now to FIG. 2, another embodiment of an optical fiber cable 10 is depicted in which the optical fiber cable 10 contains multiple subunits 25. As shown in FIG. 2, the cable jacket 26 is substantially similar to the cable jacket 26 of FIG. 1 in that the cable jacket 26 has an inner surface 28 and an outer surface 30 that defines the outermost surface of the optical fiber cable 10. Further, the cable jacket 26 includes diametrically opposed pairs of strength elements 32, a preferential access feature 34, and locating ridges 36. However, in the embodiment of FIG. 2, the inner surface 28 of the cable jacket 26 defines an internal bore 38 in which a plurality of subunits 25 are wound around a central strength member 40. In embodiments, the subunits 25 are helically wound around the central strength member 40 or SZ-stranded around the central strength member 40. In embodiments, the central strength member 40 includes a central strength element 42 and a foamed coating 44 applied around the central strength element 42. As will be discussed below, the composition of the foamed coating 44 may be the same as the composition of the foamed tube 12.

As discussed above, each subunit 25 includes a foamed tube 12 around a stack 20 of optical fiber ribbons 22. In the embodiment depicted, the stack 20 has a rectangular cross-section, but in other embodiments, the stack 20 could have, e.g., a plus-shaped cross-section as shown in FIG. 1. In FIG. 2, the stack 20 includes twelve ribbons 22, each containing twelve optical fibers 24. As with the previous embodiment, the foamed tube 12 has a central bore 18 defining from 5% to 15% of free space around the stack 20.

The winding of the subunits 25 around the central strength member 40 compresses the subunit 25 against the central strength member 40, which in conventional optical fiber cables could introduce a source of attenuation. However, in the presently disclosed optical fiber cable 10, the foam of the foamed tube 12 and the foamed coating 44 cushions against attenuation, and the free space inside the foamed tube 12 allows the optical fiber ribbons 22 to shift their positions to avoid attenuation.

Figure 3:
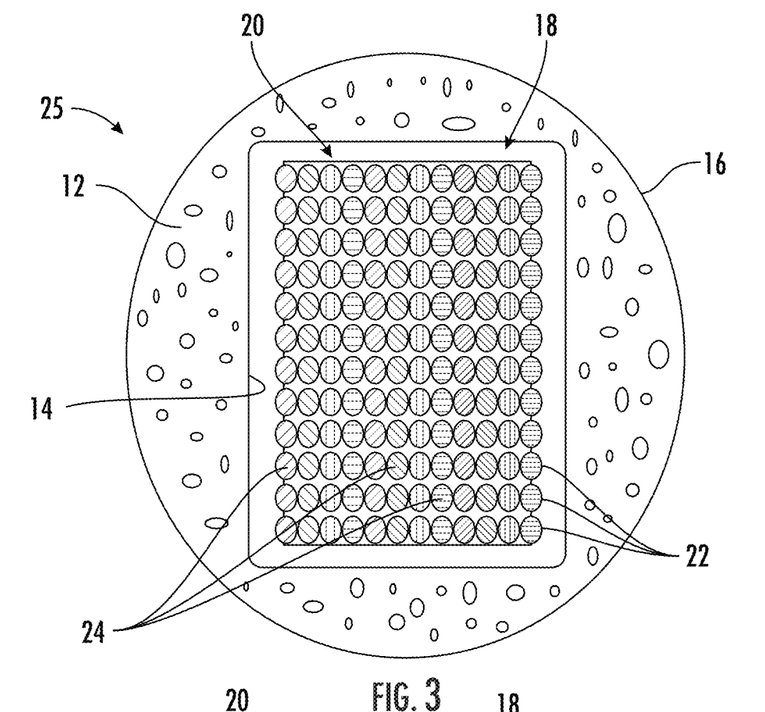
FIG. 3 depicts a circular foamed tube around a rectangular ribbon stack, according to an exemplary embodiment.
Figure 4:
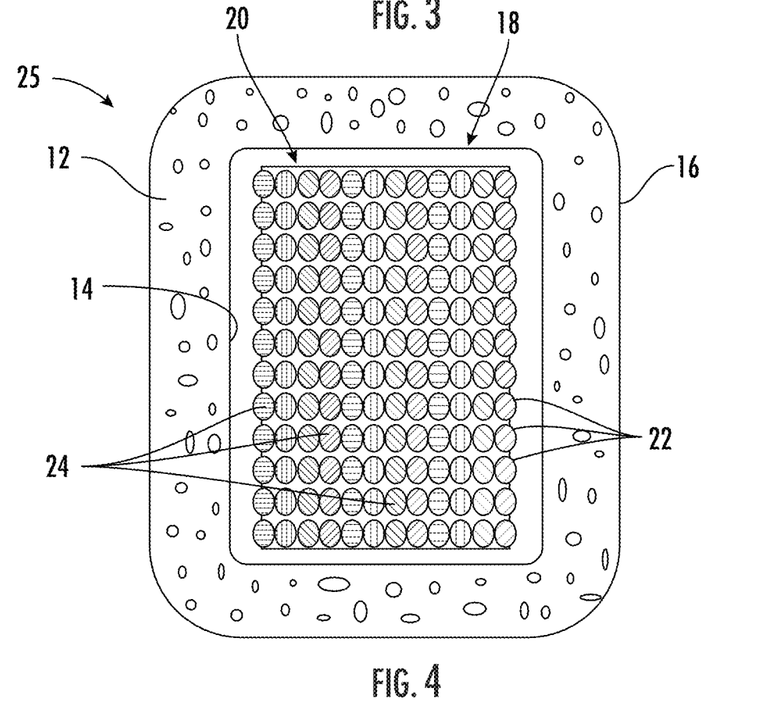
FIG. 4 depicts a rectangular foamed tube around a rectangular ribbon stack, according to an exemplary embodiment.

FIGS. 3 and 4 depict two different configurations of the subunit 25. In FIG. 3, the subunit 25 has a round cross-section. In particular, the foamed tube 12 has a variable thickness between the inner surface 14 and the outer surface 16 so as to define a round outer surface 16. As can be seen, the subunit 25 is round despite the rectangular cross-section of the stack 20 of optical fiber ribbons 22. Further, the inner surface 14 of the foamed tube 12 defines a rectangularly shaped central bore 18, providing from 5% to 15% of free space. FIG. 4 depicts another foamed tube 12 having a rectangular cross-section. In particular, the foamed tube 12 has a substantially constant thickness between the inner surface 14 and the outer surface 16 so as to define a rectangular outer surface 16. As can be seen in FIG. 4, the stack 20 is rectangular, and the inner surface 14 of the foamed tube 12 defines a rectangularly shaped central bore 18, providing from 5% to 15% of free space. While the rectangular stack 20 is depicted, the stack 20 could be another shape (e.g., plus-shaped as shown in FIG. 1), and the subunit 25 could still have either the round or rectangular outer surface 16 with only the shape of the central bore 18 changing. FIGS. 3 and 4 demonstrate that the shape of the subunit 25 can change, e.g., in an optical fiber cable 10 having multiple subunits 25 (such as shown in FIG. 2), to optimize the amount of free space within the internal bore 38 of the cable jacket 26. That is, depending on the number of subunits 25, the stranding type (helical, SZ, straight, etc.), and the amount of bending to which the optical fiber cable 10 may be subjected, not only does the central bore 18 of the subunit 25 provide free space, but the shape of the subunit 25 is able to be manipulated to provide additional free space with the optical fiber cable 10.

Having described embodiments of the optical fiber cable 10, the foam composition of the foamed tube 12 (and of the foamed coating 44) will now be described in greater detail. The foam composition includes a thermoplastic elastomer (TPE) component and optionally a low density polyethylene (LDPE) component. Further, the foam may be formed by physically foaming and/or chemically foaming the foam composition. In embodiments in which the foam is physically foamed, the foam composition may include nucleating agents, and in embodiments in which the foam is chemically foamed, the foam composition may include chemical foaming agents and cross-linkers. The composition will be described in more detailed below.

In embodiments, the foam composition includes a polymer component comprising from 70% to 100% by weight of the TPE and from 0% to 30% by weight of LDPE. The foam composition may include other typical processing additives added in an amount relative to the polymer component. On practical example of an additive is a colorant, which may be used for optical fiber cables 10 having multiple subunits 25 such as depicted in FIG. 2. In this way, the subunits 25 can be color-coded to facilitate identification in the field. In embodiments, the TPE is at least one of a polyolefin elastomer (POE), a thermoplastic polyolefin (TPO), or a thermoplastic vulcanizate (TPV). In an exemplary embodiment, the TPE is selected to have an unfoamed tensile modulus of at most 10 MPa at 100% secant according to ASTM D638. In other embodiments, the TPE is selected to have an unfoamed tensile modulus of at most 5 MPa at 100% secant according ASTM D638.

In exemplary embodiments, suitable POE for the foamed tube 12 include copolymers of ethylene and octene or butene, such as an ethylene-octene copolymer or an ethylene-butene copolymer. Such copolymers offer a low modulus at low temperature and high recovery from mechanical deformations. Two commercially available ethylene-octene copolymers include the Engage™ copolymer family and Infuse™ Olefin Block Copolymers (OBCs). The Engage™ copolymers are random copolymers and, in embodiments, have melt temperatures up to 96° C., and the Infuse™ OBC have alternating blocks of hard (highly rigid) and soft (highly elastomeric) segments and, in embodiments, have melt temperatures ranging from 118° C. to 122° C. Commercially available examples of TPOs include Catalloy TPOs of Softell grades (LyondellBasell Industries, Houston, TX), and commercially available examples of TPVs include Santoprene™ (Exxon Mobil Corporation, Irving, TX), and Sarlink® 8145 (Teknor Apex, Pawtucket, RI).

Exemplary commercial embodiments of LDPE include Agility™ 1021 or AXELERON™ 1258 (both available from Dow Chemical Company, Midland, MI).

In embodiments, the foam for the foamed tube 12 and/or foamed coating 44 is formed through physical foaming by extruding the foam composition at a sufficiently high pressure so that a gaseous blowing agent, or agents, remain dissolved in the melt until the polymer-gas saturation pressure is reached near or just beyond the exit of the extrusion die. At this saturation pressure, dissolved gas demixes as many, well-distributed bubble nuclei expand and serve as nucleation sites for additional bubble formation and growth. Further, physical nucleating agents may be added to the foam composition in order to provide nucleation sites for bubble formation. Exemplary physical nucleating agents include talc, calcium carbonate, PTFE particles, and other high surface area inorganic and polymeric materials. In embodiments, such physical nucleating agents are present in the foam composition in an amount of 0.1 to 1.0 wt %.

In embodiments, the physical foam process can also incorporate one or more chemical foaming agents to further improve foam structure. Chemical foam agents include endothermic foaming agents, such as Reedy Safoam FPE-50 (available from Reedy Chemical Foam & Specialty Additives, Charlotte, NC) and exothermic foaming agents, such as azodicarbonamide and 4,4'-oxybis(benzenesulfonyl hydrazide (commercially available as XO-107 and XO-429 from Bergen International, LLC, East Rutherford, NJ). Additionally, in embodiments, the process of physical foaming with carbon dioxide, nitrogen, or other gases (such as small chain hydrocarbons) is further enhanced with the addition of chemical foaming agent and/or physical nucleators. Additionally, the blend may include one or more additives that prevent bubbles from coalescing and that improve stability, such as glycerol monostearate (GMS).

In embodiments, the foam for the foamed tube 12 and/or foamed coating 44 is formed through chemical foaming during extruding. In embodiments, the foam composition may further include a chemical foaming agent and a crosslinking agent. In embodiments, the foam composition comprises 0.1 to 3 parts of active chemical foaming agent and 0.1 to 2 parts of the active crosslinking agent per 100 parts of the polymer component of the foam composition (i.e., per 100 parts of the TPE and LDPE).

In embodiments, the chemical foaming agent comprises at least one of azodicarbonamide, azodiisobutyronitrile, benzenesulfohydrazide, 4, 4-oxybenzenesulfonyl semicarbazide, para-toluene sulfonyl semicarbazide, barium azodicarboxylate, N, N'-dimethyl-N, N'-dinitrosoterephthalamide, trihydrazino triazine, or sodium bicarbonate. In embodiments, the chemical foaming agent is introduced to the foam composition via a masterbatch, which provides ease of handling. Commercially available examples of chemical foaming agents include Foamazol™ (Bergen International, LLC, East Rutherford, NJ), Hydrocerol® (Clariant, Muttenz, Switzerland), Safoam® (Reedy Chemical Foam & Specialty Additives, Charlotte, NC), or similar chemical foaming agents.

In embodiments, the crosslinking agent comprises a peroxide. In particular embodiments, the peroxide comprises at least one of dicumyl peroxide, di-tert-butyl peroxide, ditertiary amyl peroxide, tert-butyl peroxide, tert-butyl cumyl peroxide, dibenzoyl peroxide, or tert-butyl hydroperoxide. Masterbatch of crosslinking agent is also preferred for the ease of handling. Commercially available examples include Luperox® (Arkema S.A., Colombes, France) and PCL (Polyvel Inc., Hammonton, NJ). The crosslinking agent is used to produce free radicals during melt extrusion and induce partial crosslinks in the TPE. The partially crosslinked TPE has an increased melt strength so that the foam cell coalescence is minimized during foaming and density reduction is increased.

In embodiments, the foam is formed by extruding the foam composition around the stack 20 of optical fiber ribbons 22. Advantageously, using chemical foaming, the foam composition can be prepared by simply mixing the TPE, the LDPE, the chemical foaming agent, and the crosslinking agent in an extruder. In particular embodiments, the TPE, the LDPE, the chemical foaming agent, and the crosslinking agent are dry-mixed prior to adding them into the extruder hopper. Other additives may also be added to the foam composition in the extruder, including nucleating agents, processing aids, UV stabilizers, and/or antioxidants, among others. Successful extrusion of the foam composition as a foam is achieved by adjusting the temperature and pressure profiles within the extruder to efficiently use the chemical foaming agent. During extrusion, the temperature at the feed zone is kept low enough to prevent premature decomposition of chemical foaming agents in the barrel while still allowing a melt seal to form (otherwise gas loss may occur back through the hopper). The melt zone temperature should then increase rapidly to above the decomposition temperature of the chemical foaming agent(s) and at the same time initiate the peroxide decomposition. Sufficient pressure is maintained on the melt to prevent foaming in the extruder. In embodiments, the pressure is maintained by use of a high compression screw or temperature reduction after the melting zone of the extruder. The pressure is maintained until the foam composition exits the die at which point the rapid pressure drop initiates nucleation and foaming of the foam composition. The foam composition melt temperature at this point is kept as low as possible so that cooling can take place quickly to control expansion and limit escape of the gas. In embodiments, the temperature is kept lower than that for unfoamed plastics to enhance surface appearance.

During extrusion foaming (either physically or chemically), the amount of free space provided by the central bore 18 around the stack 20 is, in embodiments, adjusted primarily by the extrusion die tooling. During foaming, foam tends to expand in all directions at the extrusion die exit, and the extrusion tools can be designed in the way to manipulate the expansion of the foam in a desired direction, e.g., by only allowing the foam to expand in certain directions. Further, the amount of free space can be controlled by the amount of drawing down of the foam around the subunit 25. For example, a wider or narrower extrusion nozzle can be used to provide additional free space or reduce free space. Further, in embodiments, the amount of free space along the length of the subunit 25 can vary by adjusting the extrusion tooling during extrusion.

The foam formed (either physically or chemically) during extrusion of the foam composition a closed cell foam. In the foam composition, the TPE provides the elastomeric property to the foam while the LDPE provides a high expansion ratio as a result of high melt strength that results from long chain branching. During foam extrusion, if the melt strength of the blend is too low, the bubbles will rupture and coalesce before the foam is cooled and a poor quality foam with large bubbles will result. The LDPE with its long chain branching exhibits strain hardening. Strain hardening is measured in the melt and represents the increase in elongational viscosity while the melt is being strained. This allows for maximum bubble expansion without excessive rupturing and coalescing.

In embodiments, the foaming process is configured to achieve a fine, narrowly distributed closed cell morphology with equivalent circle diameter (ECD) of 10 μm to 300 μm. In other embodiments, the ECD is in the range of 20 μm to 200 μm, and in still other embodiments, the ECD is in the range of 30 μm to 100 μm. In embodiments, the resulting foam has an expansion ratio of at least 50%. In other embodiments, the resulting foam has an expansion ratio of at least 60%. Further, in embodiments, the resulting foam has a density reduction (as compared to an unfoamed blend) of 50%-70%, more particularly of 50%-60%.

Figure 5:
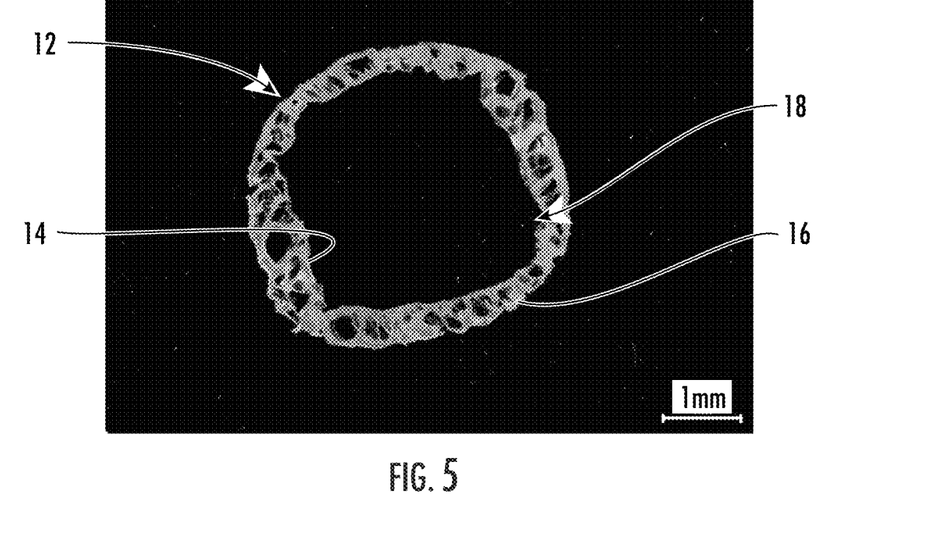
FIG. 5 depicts a photomicrograph of cross-section of a physically foamed tube for a rectangular ribbon stack, according to an exemplary embodiment.
Figure 6:
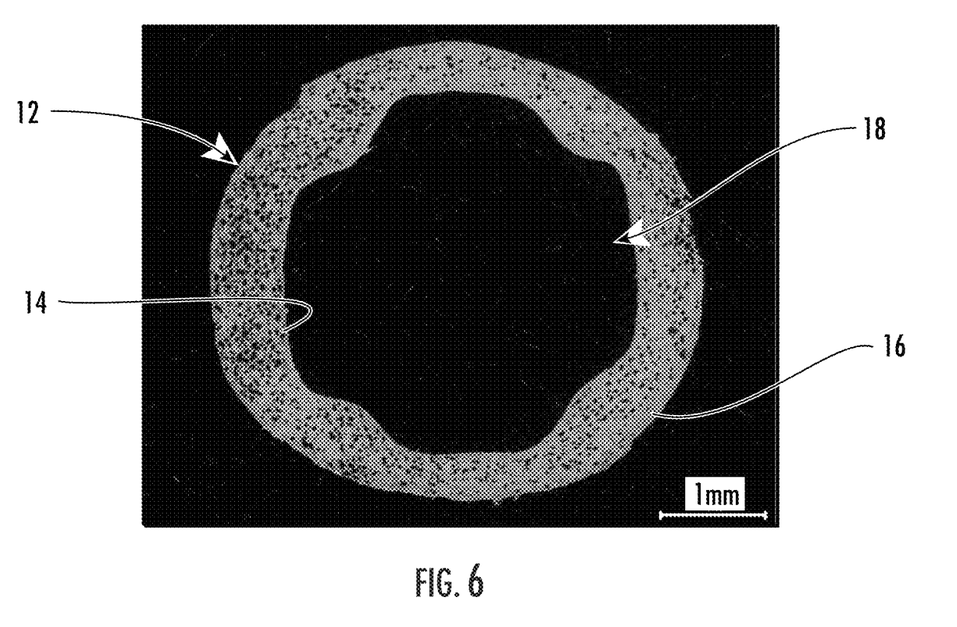
FIG. 6 depicts a photomicrograph of a cross-section of a chemically foamed tube for a cross-shaped ribbon stack, according to an exemplary embodiment.

FIGS. 5 and 6 depict foamed tubes 12 formed using physical foaming and chemical foaming, respectively. Specifically, the foamed tube 12 of FIG. 5 was formed from a foam composition comprising 70% by weight of TPE (Infuse 9807) and 30% by weight of LDPE (Agility 1021). The foaming involved $CO_2$ injected gas and chemical foaming agent. The foam had a greater than 65% density reduction, an average wall thickness of 0.5 mm, and an average cell size of 150 μm (ECD). The foam of FIG. 6 was formed from a foam composition comprising 90% by weight of TPE (Infuse 9077) and 10% by weight LDPE (Agility 1021). The foaming involved only chemical foaming agent to produce a foam with a greater than 50% density reduction, an average wall thickness of 0.5 mm and an average cell size of 50 μm (ECD). Thus, the foamed tube 12 formed via physical foaming had a larger pore size than the foamed tube formed via chemical foaming. Further, the foamed tube 12 in FIG. 5 has a central bore 18 with a rectangular cross-section, and the foamed tube 12 of FIG. 6 has a central bore with a plus-shaped cross-section. However, the physical foam and the chemical foam can be used to form a bore having either shape or another desired shape.

Advantageously, the foamed tubes 12 allow for compressive stresses to be absorbed during cable manufacturing instead of transferring such stresses to the optical fibers, which can create attenuation. For example, in the embodiment of FIG. 2 in which multiple subunits 25 are stranded around a central strength member 40, the foamed tube can be pre-compressed up to 50-60% strain during winding and still absorb compressive stresses up to at least 70% compression strain before any stress would transfer to the stack 20.

Figure 7:
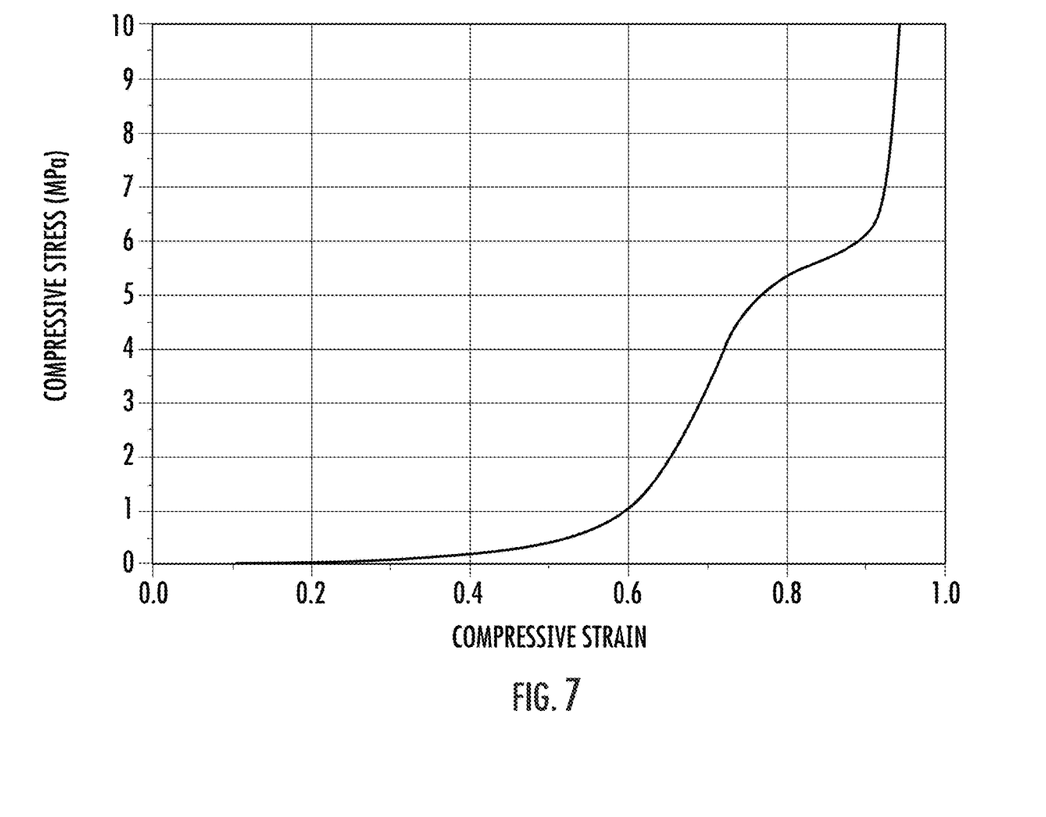
FIG. 7 depicts a stress-strain curve for the foam material of the foamed tube, according to an exemplary embodiment.

In terms of foam properties, the foam of the foamed tube 12 according to the present disclosure is configured to have a compressive modulus at 50% compression strain that is no more than 3 MPa according to an embodiment. In other embodiments, the compressive modulus at 50% compression strain that is no more than 2 MPa, and in still other embodiments, the compressive modulus at 50% compression strain that is no more than 1 MPa. FIG. 7 depicts an exemplary stress strain curve for the physical foam of FIG. 5. As can be seen in FIG. 7, the stress-strain curve has a long plateau region through at least 50% strain. Indeed, the compressive stress is no more than 1 MPa up until a strain of 60% is reached.

Further, the foam of the foamed tube 12 is configured to have a compression set of no more than 20% as measured after compression to a strain of 50% for ten hours and after four hours of recovery time. That is, after compression at a strain of 50% for 10 hours, the specimen will recover to at least 80% of its original thickness after strain was removed. Compression set measurement can be assessed via a parallel plate compression fixture on a dynamic mechanical analyzer (e.g., DMA Q800, available from TA Instruments, New Castle, DE).

The embodiments of the optical fiber cables 10 disclosed herein are envisioned to pass relevant telecommunications standards for reliability, including Telecordia GR-20 and ICEA-640. Additionally, the foam stays flexible at low temperature, having a glass transition temperature below −50° C. Further, the foam is dimensionally stable over the temperature range of −40° C. to 85° C., in particular having a shrinkback less than 5%, as required per Telecordia GR-20 industry standard for jacket components. Additionally, the materials used in the foam composition of the foamed tube have greater resistance to wasp spray than conventionally used subunit jackets made from, e.g., PVC.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber cable comprising:
a cable jacket having an inner jacket surface and an outer jacket surface, wherein the outer jacket surface is an outermost surface of the optical fiber cable and wherein the inner jacket surface defines an internal jacket bore;
at least one subunit disposed within the internal jacket bore, each of the at least one subunit comprising:
a foamed tube, the foamed tube having an inner subunit surface and an outer subunit surface, the inner subunit surface defining a central subunit bore, wherein the foamed tube is characterized by at least one of:
a closed-cell morphology having pores with an average effective circle diameter of 300 µm or less;
a compression set of no more than 20% as measured after compression to a strain of 50% for ten hours and after four hours of recovery time using a parallel plate compression fixture on a dynamic mechanical analyzer, or
a compression modulus of less than 3 MPa when measure at 50% strain as measured according to ASTM 3574, and
a stack of at least two optical fiber ribbons disposed in the central subunit bore of the foamed tube, each of the at least two optical fiber ribbons comprising at least two optical fibers;
wherein the stack occupies from 85%-95% of a cross-sectional area of the central subunit bore such that the central subunit bore provides from 5% to 15% of free space around the stack along at least a portion of a length of the foamed tube.

2. The optical fiber cable of claim 1, wherein the foamed tube comprises from 70% to 100% by weight of a thermoplastic elastomer (TPE) and 0% to 30% by weight of low density polyethylene.

3. The optical fiber cable of claim 2, wherein the TPE has an unfoamed tensile modulus of at most 10 MPa at 100% secant as measured according ASTM D638.

4. The optical fiber cable of claim 2, wherein the TPE comprises at least one of a polyolefin elastomer (POE), a thermoplastic polyolefin (TPO), or a thermoplastic vulcanizate (TPV).

5. The optical fiber cable of claim 3, comprising the POE, wherein the POE comprises a copolymer of ethylene and octene or butene.

6. The optical fiber cable of claim 1, wherein the at least one subunit comprises at least two subunits and wherein the at least two subunits are wrapped around a central strength member.

7. The optical fiber cable of claim 6, wherein the central strength member comprises a central strength element having a foamed coating surrounding the central strength element, the foamed coating comprising from 70% to 100% by weight of a thermoplastic elastomer and 0% to 30% by weight of low density polyethylene.

8. The optical fiber cable of claim 1, wherein the foamed tube comprises a closed-cell morphology having pores with an average effective circle diameter of 300 µm or less.

9. The optical fiber cable of claim 1, wherein the foamed tube comprises a compression set of no more than 20% as measured after compression to a strain of 50% for ten hours and after four hours of recovery time using a parallel plate compression fixture on a dynamic mechanical analyzer.

10. The optical fiber cable of claim 1, wherein the foamed tube has a compression modulus of less than 3 MPa when measured at 50% strain as measured according to ASTM 3574.

11. The optical fiber cable of claim 1, wherein the foamed tube comprises a glass transition temperature of −50° C. or lower.

12. The optical fiber cable of claim 1, wherein the foamed tube comprises a foam composition having a density reduction of at least 50% as compared to the foam composition in an unfoamed state.

13. A method of preparing an optical fiber cable, comprising the steps of:
   preparing a foam composition comprising a polymer component of 70% to 100% by weight of a thermoplastic elastomer (TPE) and 0% to 30% by weight of low density polyethylene, wherein the TPE has an unfoamed tensile modulus of at most 10 MPa at 100% secant as measured according ASTM D638; and
   extruding a foamed tube comprising the foam composition around a stack of optical fiber ribbons so as to form a subunit having a central bore providing from 5% to 15% of free space around the stack along a length of the foamed tube wherein the foamed tube is characterized by at least one of,
      a closed-cell morphology having pores with an average effective circle diameter of 300 μm or less;
      a compression set of no more than 20% as measured after compression to a strain of 50% for ten hours and after four hours of recovery time using a parallel plate compression fixture on a dynamic mechanical analyzer; or
      a compression modulus of less than 3 MPa when measure at 50% strain as measured according to ASTM 3574.

14. The method of claim 13, wherein during the step of extruding, the method further comprises mixing a gas with the foam composition so as to physically foam the foam composition.

15. The method of claim 13, wherein the step of preparing further comprises adding a chemical foaming agent to the foam composition and wherein the step of extruding further comprises heating the chemical foaming agent above a decomposition temperature so as to form bubbles in the foam composition.

16. The method of claim 13, further comprising the step of extruding a cable jacket around the subunit along the length, wherein the cable jacket has an outer surface that is an outermost surface of the optical fiber cable.

17. A subunit of an optical fiber cable, comprising:
   a foamed tube comprising a foam composition comprising from 70% to 100% by weight of a thermoplastic elastomer (TPE) and 0% to 30% by weight of low density polyethylene, the foamed tube having an inner surface and an outer surface, the inner surface defining a central bore; and
   a stack of at least two optical fiber ribbons disposed in the central bore of the foamed tube, each of the at least two optical fiber ribbons comprising at least two optical fibers;
   wherein a cross-section of the central bore provides from 5% to 15% of free space around the stack along at least a portion of a length of the foamed tube; and
   wherein the foamed tube has a compression modulus of less than 3 MPa when measured at 50% strain as measured according to ASTM 3574.

18. The subunit of claim 17, wherein the TPE has an unfoamed tensile modulus of at most 10 MPa at 100% secant as measured according to ASTM D638.

19. The subunit of claim 17, wherein the foamed tube comprises a compression set of no more than 20% as measured after compression to a strain of 50% for ten hours and after four hours of recovery time using a parallel plate compression fixture on a dynamic mechanical analyzer.

20. The subunit of claim 17, wherein the foamed tube has a density reduction of at least 50% as compared to the foam composition in an unfoamed state.

* * * * *

UNITED STATES PATENT AND TRADEMARK OFFICE
CERTIFICATE OF CORRECTION

PATENT NO. : 11,880,083 B2  
APPLICATION NO. : 18/084857  
DATED : January 23, 2024  
INVENTOR(S) : Anne Germaine Bringuier et al.

Page 1 of 1

It is certified that error appears in the above-identified patent and that said Letters Patent is hereby corrected as shown below:

In the Claims

In Column 10, Line 23, in Claim 1, delete "analyzer," and insert -- analyzer; --.
In Column 10, Line 25, in Claim 1, delete "measure" and insert -- measured --.
In Column 11, Line 25, in Claim 13, delete "of," and insert -- of: --.
In Column 11, Line 34, in Claim 13, delete "measure" and insert -- measured --.

Signed and Sealed this
Eleventh Day of June, 2024

Katherine Kelly Vidal
*Director of the United States Patent and Trademark Office*